United States Patent
Lee et al.

(10) Patent No.: US 8,965,436 B2
(45) Date of Patent: Feb. 24, 2015

(54) METHOD FOR CONTROLLING UPLINK TRANSMIT POWER IN MOBILE COMMUNICATION SYSTEM

(75) Inventors: Hee Soo Lee, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 192 days.

(21) Appl. No.: 13/817,362

(22) PCT Filed: Aug. 16, 2011

(86) PCT No.: PCT/KR2011/006009
§ 371 (c)(1),
(2), (4) Date: Feb. 15, 2013

(87) PCT Pub. No.: WO2012/023785
PCT Pub. Date: Feb. 23, 2012

(65) Prior Publication Data
US 2013/0143614 A1    Jun. 6, 2013

(30) Foreign Application Priority Data
Aug. 17, 2010    (KR) .................. 10-2010-0079535

(51) Int. Cl.
*H04B 7/00* (2006.01)
*H04W 52/14* (2009.01)
(Continued)

(52) U.S. Cl.
CPC ........ *H04W 52/146* (2013.01); *H04W 72/0473* (2013.01); *H04W 72/0446* (2013.01);
(Continued)

(58) Field of Classification Search
CPC .................. H04W 72/0446; H04W 72/0473; H04W 52/146

USPC ............... 455/509, 511, 522.1, 69, 68, 127.1, 455/500, 517, 445, 422.1, 403, 550.1, 455/426.1, 426.2, 507, 508, 515, 450, 455/452.1, 452.2, 524, 525; 370/328, 310, 370/329, 338, 343

See application file for complete search history.

(56) References Cited

U.S. PATENT DOCUMENTS 8,654,704 B2 *  2/2014  Kwon et al. .................. 370/328
2010/0208685 A1  8/2010  Kim et al.
(Continued)

FOREIGN PATENT DOCUMENTS

KR    10-2009-0038132    4/2009
KR    10-2009-0038654    4/2009
(Continued)

OTHER PUBLICATIONS

International Search Report and Written Opinion for Application No. PCT/KR2011/006009, 6 pages, dated Apr. 4, 2012.

*Primary Examiner* — Keith Ferguson
(74) *Attorney, Agent, or Firm* — Nelson Mullins Riley & Scarborough LLP

(57) ABSTRACT

Disclosed is a method for controlling uplink transmit power in a mobile communication system. A mobile communication includes a first base station and a second base station which are located in two mutually adjacent cells, respectively, at least one base station of the first and second base stations which generate a subframe offset of transmit power (SOTP), and transmits a subframe offset of transmit power generated by at least one base station of the first and second base stations to at least one terminal which belongs to a corresponding cell. Accordingly, it is possible to reduce signaling times for transmit power control, and to accurately control transmit power.

13 Claims, 5 Drawing Sheets

(51) Int. Cl.
  *H04W 52/36* (2009.01)
  *H04W 52/40* (2009.01)
  *H04W 52/24* (2009.01)
  *H04W 72/04* (2009.01)

(52) U.S. Cl.
  CPC ............ *H04W52/362* (2013.01); *H04W 52/40* (2013.01); *H04W 52/247* (2013.01); *H04W 52/248* (2013.01)
  USPC ............. 455/509; 455/522; 455/511; 455/69; 455/426.1; 455/517; 370/328; 370/310; 370/329; 370/338; 370/343

(56) References Cited

U.S. PATENT DOCUMENTS

2010/0331037 A1* 12/2010 Jen ................................ 455/522
2011/0098054 A1* 4/2011 Gorokhov et al. ......... 455/452.1

FOREIGN PATENT DOCUMENTS

KR  10-2009-0109699     10/2009
WO     2012/023785 A2    2/2012

\* cited by examiner

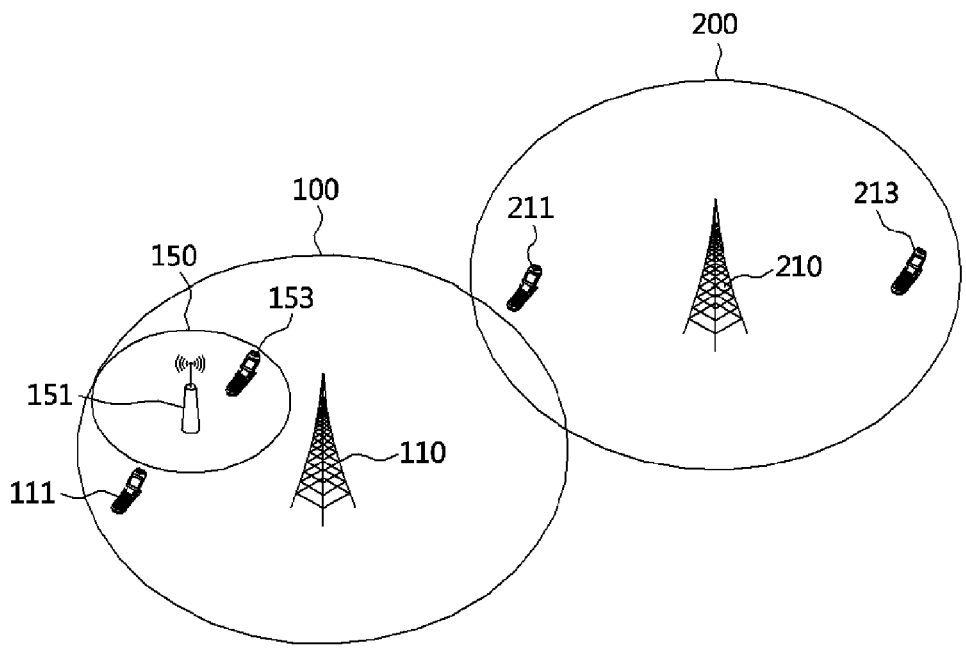

METHOD FOR CONTROLLING UPLINK TRANSMIT POWER IN MOBILE COMMUNICATION SYSTEM

RELATED APPLICATIONS

This application is a 35 U.S.C. §371 filing of International Application Number PCT/KR2011/006009 which was filed on 16 Aug. 2011 and which claims priority to, and the benefit of, Korean Application No.: 10-2010-0079535, filed on 17 Aug. 2010. The contents of the aforementioned applications are hereby incorporated herein by reference.

TECHNICAL FIELD

The present invention relates to a mobile communication system, and more particularly, to a method for controlling uplink transmit power in a mobile communication system.

BACKGROUND ART

Inter-cell interference coordination (ICIC) is a scheduling strategy for obtaining a high data rate in a cell edge region in consideration of inter-cell interference. Basically, ICIC involves setting specific constraints in an uplink and downlink scheduler in order to coordinate interference due to transmission in adjacent cells. If transmit power of some frequencies is suppressed in a specific cell, interference sensed at the frequencies in adjacent cells will be lowered, and such spectra may be used to provide a higher data rate to users in the adjacent cells.

A 3GPP LTE system supports a function of exchanging interference indicators, such as Relative Narrowband Tx Power (RNTP), RNTP threshold, UpLink High Interference Indicator (UL HII), and UL Interference Overload Indicator (UL IOI), between base stations in order to implement a variety of ICIC schemes. The interference indicators are defined in a frequency domain and used to manage interference between adjacent cells by limiting transmission in the frequency domain.

Meanwhile, a technique for performing ICIC in a time domain (time-domain ICIC), as well as in the frequency domain, for ICIC in a heterogeneous network environment has been proposed.

However, in the time-domain ICIC, a size of an interference signal between adjacent cells greatly differs according to whether or not a subframe is used. Accordingly, interference must be coordinated for each subframe through a transmit power control (TPC) command, causing frequent generation of TPC signaling.

Further, it is difficult for accurate transmit power control in a time-domain ICIC method to be performed when the size of the interference signal exceeds a previously set power control range.

DISCLOSURE

Technical Problem

An object of the present invention is to provide a method of controlling uplink transmit power that is capable of reducing a signaling number for transmit power control and performing accurate transmit power control.

Technical Solution

According to an aspect of the present invention, there is provided a method of controlling uplink transmit power in a mobile communication system including first and second base stations respectively located in two adjacent cells, the method including: creating, by at least one of the first and second base stations, a subframe offset of transmit power (SOTP); and transmitting, by the at least one of the first and second base stations, the created SOTP to at least one terminal belonging to a corresponding one of the cells.

Here, the creating of the SOTP may include acquiring, by the second base station, resource allocation information of the first base station; and creating the SOTP for each subframe based on position information of an almost blank subframe (ABS) in the acquired resource allocation information of the first base station.

Here, the creating of the SOTP may include creating the SOTP using either of a cell-specific scheme and a terminal-specific (UE specific) scheme.

The transmitting of the created SOTP to the at least one terminal belonging to the corresponding one of the cells may include transmitting the created SOTP through system information if the SOTP is created using the cell-specific scheme and through signaling of a protocol layer located in a higher layer than a second layer if the SOTP is created using the terminal-specific scheme.

Here, the method of controlling uplink transmit power in a mobile communication system may further include correcting, by the at least one terminal receiving the SOTP from the second base station, transmit power of each subframe based on the SOTP.

Here, the creating of the SOTP may include creating the SOTP as a vector of an SOTP having a certain period based on a position pattern of an ABS in the acquired resource allocation information of the adjacent cell.

Here, the method of controlling uplink transmit power in a mobile communication system may further include correcting, by at least one terminal receiving the subframe offset vector of the transmit power from the second base station, transmit power of each subframe based on the SOTP vector.

Here, the creating of the SOTP may include creating two SOTPs based on position information of an ABS in the acquired resource allocation information of the adjacent cell and setting the SOTP for each subframe as either of the two created SOTPs.

Here, the transmitting of the created SOTP to the at least one terminal belonging to the corresponding one of the cells may include setting the one of the two created SOTPs as a reference offset and transmitting only positions of subframes to which the other offset is applied to the at least one terminal.

Here, the transmitting of the created SOTP to the at least one terminal belonging to the corresponding one of the cells may include setting the one of the two created SOTPs as a reference offset and transmitting a period and position offsets of the subframes to which the other offset is applied to the at least one terminal if the positions of subframes to which the other offset is applied have the period.

According to another aspect of the present invention, there is provided a method of controlling uplink transmit power in a mobile communication system including first and second base stations respectively located in two adjacent cells, the method including: creating a plurality of subframe sets by at least one of the first and second base stations; transmitting, by the at least one of the first and second base stations, information of the plurality of created subframe sets to at least one terminal belonging to a corresponding cell of the cells; and transmitting, by the at least one of the first and second base stations, a transmit power control (TPC) command for each created subframe set to the at least one terminal.

Here, the creating of the plurality of subframe sets by the at least one of the first and second base stations may include acquiring, by the second base station, resource allocation information of the first base station; and creating the plurality of subframe sets based on position information of ABSs in the acquired resource allocation information of the first base station.

Here, the transmitting of the TPC command for each created subframe set to the at least one terminal may include transmitting, by the second base station, a TCP command applied to all the subframe sets in common to the at least one terminal.

Advantageous Effects

According to the method of controlling uplink transmit power in a mobile communication system as described above, a given base station creates the SOTP based on the resource allocation information of the adjacent cell (i.e., position information of the almost blank subframe) provided from a base station located in an adjacent cell and transmits the SOTP to each terminal, and each terminal corrects the uplink transmit power based on the SOTP received from the given base station. Alternatively, a plurality of subframe sets are created based on the resource allocation information of the adjacent cell provided from the base station located in the adjacent cell, and then a TPC command for each of the plurality of created subframe sets is provided.

Thus, it is possible to reduce the signaling number for uplink transmit power control and perform accurate transmit power control.

DESCRIPTION OF DRAWINGS

FIG. 1 is a conceptual diagram illustrating a heterogeneous network environment in which a method of controlling uplink transmit power according to an embodiment of the present invention is performed.

FIG. 2 is a conceptual diagram illustrating a method of coordinating inter-cell interference in a time domain, which is performed in the heterogeneous network environment shown in FIG. 1.

MODES OF THE INVENTION

Figure 3:
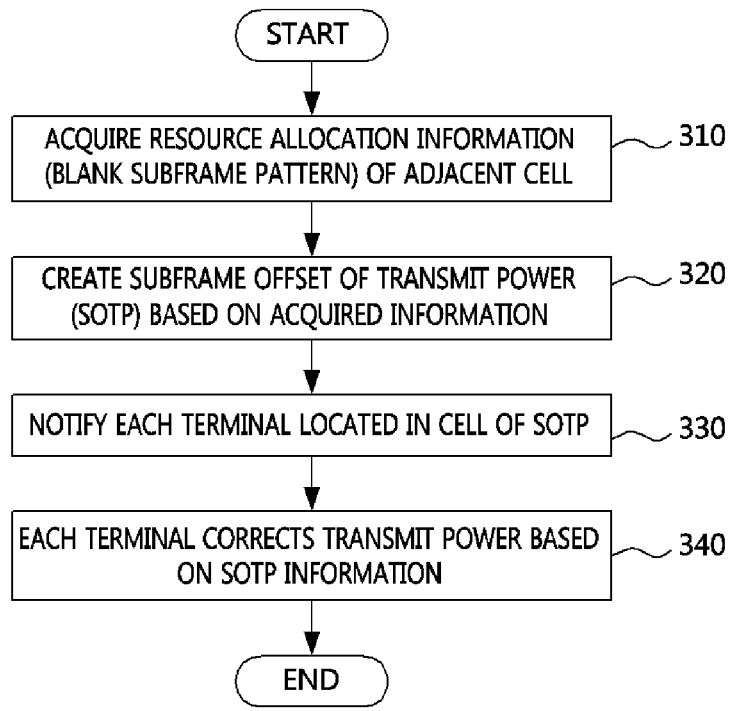
FIG. 3 is a flowchart illustrating the method of controlling uplink transmit power according to an embodiment of the present invention.

While the invention is susceptible to various modifications and alternative forms, specific embodiments thereof are shown by way of example in the drawings and will herein be described in detail.

However, it should be understood that there is no intent to limit the invention to the particular forms disclosed, but on the contrary, the invention is to cover all modifications, equivalents, and alternatives falling within the spirit and scope of the invention The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, exemplary embodiments of the present invention will be described in detail. To facilitate understanding of the present invention, like numbers refer to like elements throughout the description of the drawings, and description of the same element will not be reiterated.

The method of controlling uplink transmit power according to an embodiment of the present invention is applicable to a variety of mobile communication systems, including LTE, LTE-Advanced, WiMAX and WiBro. Further, in an embodiment of the present invention, a "terminal" may refer to a mobile station (MS), mobile terminal (MT), user terminal, user equipment (UE), user terminal (UT), wireless terminal, access terminal (AT), subscriber unit, subscriber station (SS), wireless device, wireless communication device, wireless transmit/receive unit (WTRU), mobile node, mobile, or other terminology. Further, "base station" generally refers to a stationary point that communicates with the terminal, and may refer to a node-B, eNode-B, base transceiver system (BTS), access point, transmission point, remote radio head (RRH), or the like.

FIG. 1 is a conceptual diagram illustrating a heterogeneous network environment in which a method of controlling uplink transmit power according to an embodiment of the present invention is performed. FIG. 2 is a conceptual diagram illustrating a method of coordinating inter-cell interference in a time domain, which is performed in the heterogeneous network environment shown in FIG. 1.

Hereinafter, the method of coordinating inter-cell interference in a time domain will be described with reference to FIGS. 1 and 2.

First, referring to FIG. 1, a first macro base station 110 and a second macro base station 210 are present in a first macro cell 100 and a second macro cell 200 that are adjacent to each other, respectively. A pico cell 150 (or a femto cell) is present in the first macro cell 100, and a pico base station 151 is present in the pico cell 150.

A first terminal 111 belonging to the first macro cell 100 is provided with service from the first macro base station 110, and a second terminal 211 and a third terminal 213 belonging to the second macro cell 200 are provided with service from the second macro base station 210. Further, a fourth terminal 153 belonging to the pico cell 150 is provided with service from the pico base station 151.

In the heterogeneous network environment as shown in FIG. 1, each of the first macro base station 110 and the second macro base station 210 coordinates inter-cell interference by controlling uplink transmit power in a time domain in consideration of a resource allocation situation of the adjacent cell.

FIG. 2 shows an example of subframes used for data transmission and reception by the respective base stations shown in FIG. 1 and subframes not used. The pico base station 151 located in the pico cell 150 of the first macro cell 100 improves performance of a cell edge user by using resources (i.e., subframes) not used by the first macro base station 110 for the cell edge user. For example, the first macro base station 110 improves the performance of the cell edge user by not allocating subframe 0 to the cell edge user at time t0. Here, a subframe that does not transmit data or allows much less transmit power when it does transmit data may also be referred to as a "blank subframe" or an "almost blank subframe (ABS)."

Meanwhile, the second macro base station 210 uses all subframes since there are no other base stations in the second macro cell 200.

In the method of coordinating inter-cell interference in the time domain, subframes used for data transmission and reception in each cell are classified in the time domain as described above and base stations in different cells do not use the subframes at the same time, thus coordinating the interference between the adjacent cells.

A mobile communication system, including a 3GPP LTE, uses uplink transmit power control. The uplink transmit power control is to control transmit power of different uplink physical channels, such as Physical Uplink Control CHannel (PUCCH), Physical Uplink Shared CHannel (PUSCH), or uplink Sounding Reference Signals (SRSs), and signals so that the physical channels and the signals are received with appropriate power in a cell. A primary object of the uplink transmit power control is to acquire a required received Signal to Interference plus Noise Ratio (SINR) and to control interference with an adjacent cell.

In the uplink power control, terminal transmit power control is a combination of power control using an open-loop scheme and power control using a close-loop scheme. In the open-loop scheme, a terminal determines transmit power using a static or semi-static parameter provided from a base station, in which the transmit power of the terminal varies with downlink path attenuation. In the close-loop scheme, a base station directly controls the transmit power of the terminal through an explicit transmit power control (TPC) command transmitted via a downlink.

Specifically, the transmit power of the terminal in the 3GPP LTE system may be determined using Equation 1.

UE Tx Power=$P_0+\alpha PL+f(\Delta_{TPC})+\Delta_{TF}+10 \log_{10} M$ [Equation 1]

Equation 1, the first two terms, $P_0+\alpha \cdot PL$, indicate power control terms according to the open-loop scheme and have a static or semi-static characteristic that does not vary rapidly. Further, the last two terms in Equation 1, $\Delta_{TF}+10 \log_{10} M$, are automatically determined according to a transmission format and a transmission bandwidth.

In Equation 1, $P_0$ denotes a cell-specific parameter broadcast as part of system information, $\alpha$ denotes a path attenuation compensation parameter, PL denotes a downlink path attenuation value estimated by a terminal, and $\Delta_{TF}$ denotes an offset value indicating transmit power correction for power control reflecting different SINR requirements for an uplink physical channel (e.g., PUCCH or PUSCH) format. M denotes the number of resource blocks effective for a specific subframe and means a bandwidth of allocated resources.

Further, $f(\Delta_{TPC})$ denotes a transmit power control term according to the close-loop scheme that a base station directly provides to a terminal through an explicit TPC command. An accumulative scheme may be used. That is, each terminal can increase or decrease the $\Delta_{TPC}$ value by a specific amount based on the received TPC command.

If time domain inter-cell interference coordination (time-domain ICIC) is performed, a size of an interference signal between adjacent cells from which the base station suffers may differ from a subframe to a frame. For example, in FIG. 2, since both the first macro base station 110 and the second macro base station 210 use subframe 0, the first macro base station 110 and the second macro base station 210 suffer from great interference. Meanwhile, since subframe 1 is used by the second macro base station 210 and not by the first macro base station 110, a user of the second macro base station 210 does not receive interference from the first macro base station 110.

If the size of the inter-cell interference signal greatly differs from a subframe to a subframe as described above, the first macro base station 110 and/or the second macro base station 210 must coordinate the transmit power for each subframe through the TPC command $f(\Delta_{TPC})$ in order to obtain a certain required received SINR for all subframes. If the size of the inter-cell interference signal exceeds a previously set transmit power control range, it is difficult to perform accurate transmit power control.

In order to resolve the foregoing problems, the method of controlling uplink transmit power according to an embodiment of the present invention uses a characteristic that a pattern of a subframe not used for data transmission and reception (i.e., a blank subframe or an ABS) has a period in an environment in which ICIC is performed in a time domain.

FIG. 3 is a flowchart illustrating the method of controlling uplink transmit power according to an embodiment of the present invention. A method of controlling uplink transmit power in the second macro cell 200 shown in FIGS. 1 and 2 is shown by way of example.

The method of controlling uplink transmit power according to an embodiment of the present invention will be described with reference to FIGS. 1 through 3. First, the second macro base station 210 acquires resource allocation information of the first macro cell 100 adjacent to the second macro cell 200 (step 310). Here, the first macro base station 110 and the second macro base station 210 may exchange the resource allocation information (i.e., a position pattern of the blank subframe or the ABS) via an interface connected between the base stations (e.g., an X2 interface), enabling the second macro base station 210 to acquire the resource allocation information set by the first macro base station 110.

The second macro base station 210 creates a subframe offset of transmit power (SOTP) $\Delta_{SF}(i)$ for each subframe i based on the acquired resource allocation information of the first macro base station 110 and/or resource allocation information allocated by the second macro base station 210 (step 320). Here, the second macro base station 210 compares the resource allocation information acquired from the first macro base station 110, i.e., the pattern of the subframe used for data transmission and reception or the blank subframe, with its own subframe pattern to estimate a size of an inter-cell interference signal between the first macro cell 100 and the second macro cell 200, and then create the SOTP for each subframe.

Further, the second macro base station 210 may set the SOTP for each subframe using a cell-specific scheme equally applied to all terminals in a cell or a terminal-specific (UE-specific) scheme differently applied to each terminal located in a cell.

The second macro base station 210 then informs each terminal located in the second macro cell 200 of the created SOTP for each subframe (step 330). Here, the second macro base station 210 may notify each terminal in the cell of the SOTP for each subframe using system information if the SOTP for each subframe is set using the cell-specific scheme, and may notify each terminal in the cell of the SOTP for each subframe using a Radio Resource Control (RRC) message if the SOTP for each subframe is set using the UE-specific scheme.

Each terminal located in the second macro cell 200 corrects uplink transmit power based on the SOTP for each subframe transmitted from the second macro base station 210 (step 340).

For example, in the 3GPP LTE system, each terminal 211 or 213 located in the second macro cell 200 may correct the uplink transmit power using the following Equation 2 or 3:

$$\text{UE Tx Power at the } i^{th} \text{ subframe} = P_0 + \alpha \cdot PL + f(\Delta_{TPC}) + \Delta_{TF} 10 \log_{10} M + \Delta_{SF}(i)[dBm] \quad \text{[Equation 2]}$$

$$\text{UE Tx Power at the } i^{th} \text{ subframe} = \Delta_{SF}(i) \cdot [P_0 + \alpha \cdot PL + f(\Delta_{TPC}) + \Delta_{TF} + 10 \log_{10} M][dBm] \quad \text{[Equation 3]}$$

In Equation 2 or 3, $f(\Delta_{TPC})$ may always be 0.

Figure 4:
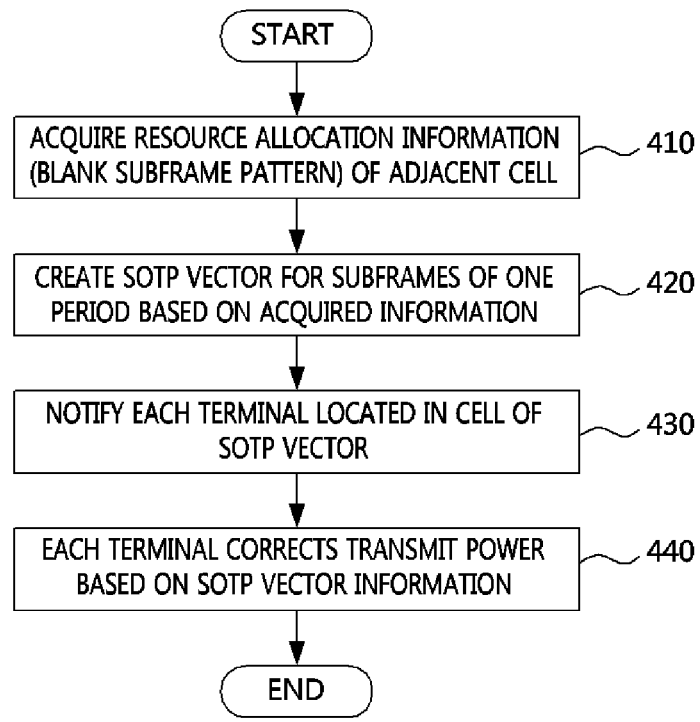
FIG. 4 is a flowchart illustrating a method of controlling uplink transmit power according to another embodiment of the present invention.
Figure 5:
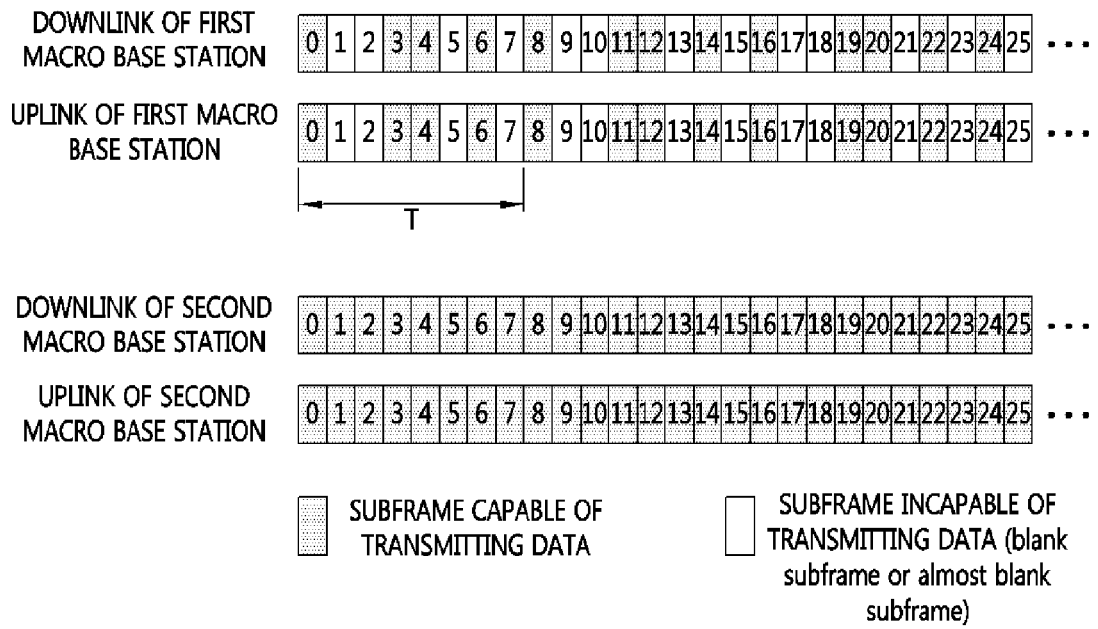
FIG. 5 is a conceptual diagram for explaining the method of controlling uplink transmit power according to another embodiment of the present invention shown in FIG. 4.

FIG. 4 is a flowchart illustrating a method of controlling uplink transmit power according to another embodiment of the present invention. The method of controlling uplink transmit power in the second macro cell 200 shown in FIGS. 1 and 2 is shown by way of example. Further, FIG. 5 is a conceptual diagram for explaining the method of controlling uplink transmit power according to another embodiment of the present invention shown in FIG. 4.

The method of controlling uplink transmit power according to another embodiment of the present invention will be described with reference to FIGS. 1, 2, 4 and 5. First, the second macro base station 210 acquires the resource allocation information of the first macro cell 100 adjacent to the second macro cell 200 (step 410). Here, the first macro base station 110 and the second macro base station 210 may exchange the resource allocation information (i.e., a position pattern of the blank subframe or the ABS) via an interface connected between the base stations (e.g., an X2 interface), enabling the second macro base station 210 to acquire the resource allocation information set by the first macro base station 110.

The second macro base station 210 creates an SOTP based on the acquired resource allocation information of the first macro base station 110 and/or resource allocation information allocated by the second macro base station 210 (step 420).

Here, the second macro base station 210 may form the SOTP to have a certain period based on the pattern of the resource allocation information acquired from the first macro base station 110, i.e., the subframe used for data transmission and reception or the ABS.

That is, if a subframe offset period of the transmit power is T, the second macro base station 210 creates an SOTP vector corresponding to one period, like $[\Delta_{SF}(0), \Delta_{SF}(1), \Delta_{SF}(2), \ldots, \Delta_{SF}(T)]$.

This method may be useful if the pattern of the ABS is repeated in a certain period. For example, if the blank subframe pattern of the first macro base station is repeated by eight frames as shown in FIG. 5, the second macro base station 210 creates the SOTP vectors $[\Delta_{SF} 0, \Delta_{SF} 1, \Delta_{SF} 2, \ldots, \Delta_{SF} 7]$ for eight subframes corresponding to one period T (i.e., subframes 0 to 7) and transmits the vectors to the terminal. The terminal corrects the transmit power for all subframes using the received SOTP vectors of one period, thus greatly reducing a signaling number compared to transmission of the SOTP for all subframes.

The second macro base station 210 then informs each terminal located in the second macro cell 200 of the created SOTP vector of one period (step 430).

Each terminal located in the second macro cell 200 corrects the uplink transmit power based on the SOTP vector transmitted from the second macro base station 210 (step 440).

For example, in the 3GPP LTE system, each terminal located in the second macro cell 200 may correct the uplink transmit power using the following Equation 4 or 5:

$$\text{UE Tx Power at the } i^{th} \text{ subframe} = P_0 + \alpha \cdot PL + f(\Delta_{TPC}) + \Delta_{TF} + 10 \log_{10} M \Delta_{SF}(i \bmod T)[dBm] \quad \text{[Equation 4]}$$

$$\text{UE Tx Power at the } i^{th} \text{ subframe} = \Delta_{SF}(i \bmod T) \cdot [P_0 + \alpha \cdot PL + f(\Delta_{TPC}) + \Delta_{TF} + 10 \log_{10} M][dBm] \quad \text{[Equation 5]}$$

Figure 6:
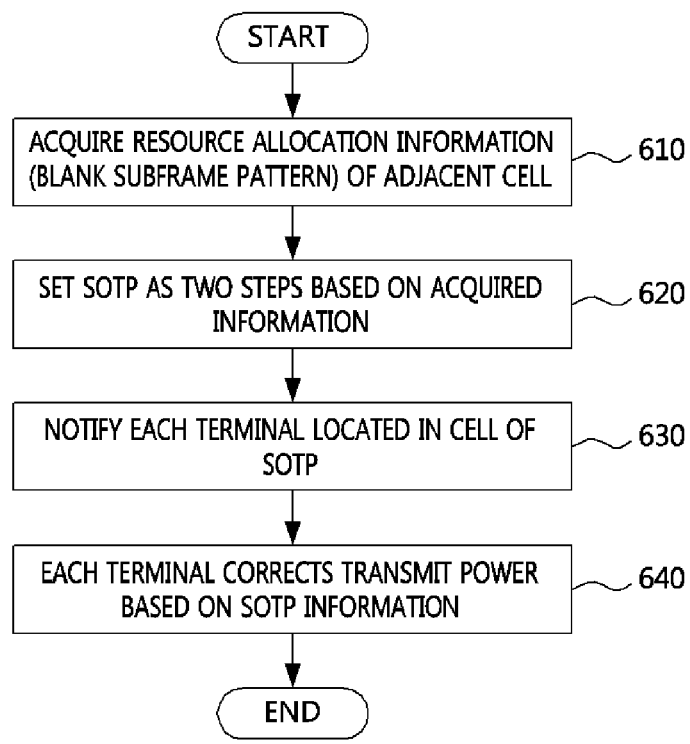
FIG. 6 is a flowchart illustrating a method of controlling uplink transmit power according to yet another embodiment of the present invention.

FIG. 6 is a flowchart illustrating a method of controlling uplink transmit power according to yet another embodiment of the present invention.

The method of controlling uplink transmit power according to yet another embodiment of the present invention will be described with reference to FIGS. 1, 2 and 6. First, the second macro base station 210 acquires resource allocation information of the first macro cell 100 adjacent to the second macro cell 200 (step 610). Here, the first macro base station 110 and the second macro base station 210 may exchange resource allocation information (i.e., a position pattern of a blank subframe or an ABS) via an interface connected between the base stations (e.g., an X2 interface), enabling the second macro base station 210 to acquire resource allocation information set by the first macro base station 110.

The second macro base station 210 sets a level of the SOTP for each subframe as either of two steps based on the acquired resource allocation information of the first macro base station 110 and/or the resource allocation information allocated by the second macro base station 210 (step 620).

For example, the SOTP for each subframe may be set as either of $\Delta_{SF}^{0}$ and $\Delta_{SF}^{1}$. Here, one of $\Delta_{SF}^{0}$ and $\Delta_{SF}^{1}$ may be set to a value (e.g., 0) indicating that the SOTP is not used.

This method may be useful when the size of the inter-cell interference signal is divided into two levels.

Further, in a method of setting the level of the SOTP for each subframe as the two steps as described above, the second macro base station 210 may set either $\Delta_{SF}^{0}$ or $\Delta_{SF}^{1}$ as a reference offset level and transmit only a position of a subframe to which the other offset level is applied, to the terminal. For example, the second macro base station 210 may set $\Delta_{SF}^{0}$ to a reference offset level and provide only a position of a subframe to which $\Delta_{SF}^{1}$ is applied, to the terminal. Here, the position of the subframe to which $\Delta_{SF}^{1}$ is applied may be in a bitmap form. If the position of the subframe to which $\Delta_{SF}^{1}$ is applied has a period, the second macro base station 210 may provide only the period and the position offset of the subframe to the terminal.

Then, the second macro base station 210 informs each terminal located in the second macro cell 200 of the created SOTP, as described above (step 630).

Each terminal located in the second macro cell 200 corrects the uplink transmit power based on the SOTP received from the second macro base station 210 (step 640).

For example, in the 3GPP LTE system, each terminal located in the second macro cell 200 may correct transmit power of a subframe using the following Equation 6 when $\Delta_{SF}^{0}$ is applied to the subframe and the following Equation 7 when $\Delta_{SF}^{1}$ is applied to the subframe.

$$UETxPower=P_0+\alpha \cdot PL+f(\Delta_{TPC})+\Delta_{TF}+10\log_{10}M+\Delta_{SF}^{0}[dBm] \text{ or}$$

$$UETxPower=\Delta_{SF}^{0} \cdot [P_0+\alpha \cdot PL+f(\Delta_{TPC})+\Delta_{TF}+10\log_{10}M][dBm] \quad \text{[Equation 6]}$$

$$UETxPower=P_0+\alpha \cdot PL+f(\Delta_{TPC})+\Delta_{TF}+10\log_{10}M+\Delta_{SF}^{1}[dBm] \text{ or}$$

$$UETxPower=\Delta_{SF}^{1} \cdot [P_0+\alpha \cdot PL+f(\Delta_{TPC})+\Delta_{TF}+10\log_{10}M][dBm] \quad \text{[Equation 7]}$$

Alternatively, if $\Delta_{SF}^{0}$ is set as a reference, a position of a subframe to which $\Delta_{SF}^{1}$ is applied has a period T, and the position offset of the subframe is set to 0 as described above, the terminal may correct the transmit power of the i-th subframe using Equation 8:

$$UE\ Tx\ \text{Power at the } i^{th} \text{ subframe} = \begin{cases} P_0+\alpha \cdot PL+f(\Delta_{TPC})+ \\ \Delta_{TF}+10\log_{10}M+\Delta_{SF}^{1}, & \text{if } 0=i\bmod T \\ P_0+\alpha \cdot PL+f(\Delta_{TPC})+ \\ \Delta_{TF}+10\log_{10}M+\Delta_{SF}^{0}, & \text{otherwirse} \end{cases} [dBm] \quad \text{[Equation 8]}$$

Figure 7:
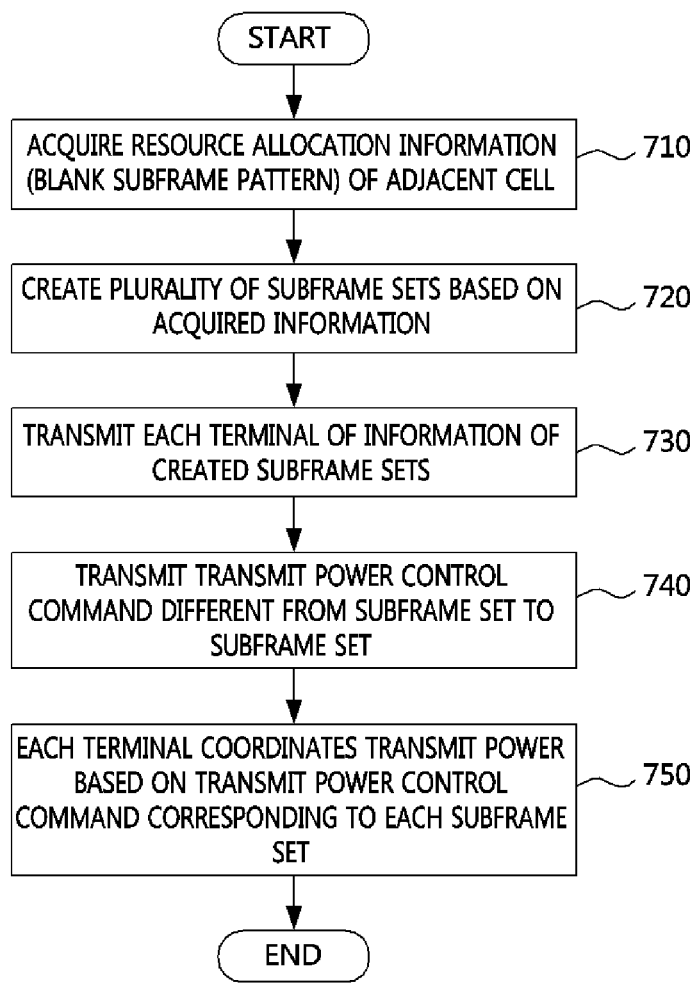
FIG. 7 is a flowchart illustrating a method of controlling uplink transmit power according to yet another embodiment of the present invention.
Figure 8:
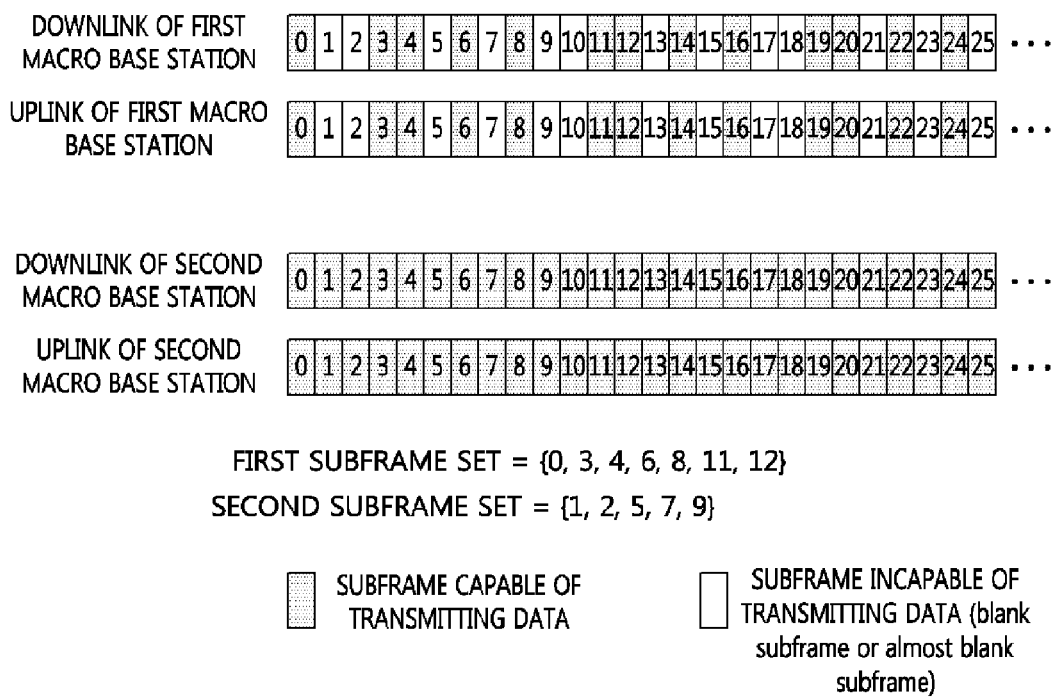
FIG. 8 is a conceptual diagram for explaining the method of controlling uplink transmit power according to yet another embodiment of the present invention.

FIG. 7 is a flowchart illustrating a method of controlling uplink transmit power according to yet another embodiment of the present invention, and FIG. 8 is a conceptual diagram for explaining the method of controlling uplink transmit power according to yet another embodiment of the present invention.

The method of controlling uplink transmit power according to yet another embodiment of the present invention will be described with reference to FIGS. 1, 2, 7 and 8. First, the second macro base station 210 acquires resource allocation information of the first macro cell 100 adjacent to the second macro cell 200 (step 710). Here, the first macro base station 110 and the second macro base station 210 may exchange resource allocation information (i.e., a position pattern of a blank subframe or an ABS) via an interface connected between base stations (e.g., an X2 interface), enabling the second macro base station 210 to acquire resource allocation information set by the first macro base station 110.

The second macro base station 210 creates a plurality of subframe sets based on the acquired resource allocation information of the first macro base station 110 and/or the resource allocation information allocated by the second macro base station 210 (step 720). Here, the second macro base station 210 may compare its blank subframe pattern with the blank subframe allocated by the first macro base station 110 and create a plurality of subframe sets based on the result of comparison.

For example, if use patterns of subframes allocated by the first macro base station 110 and the second macro base station 210 are as shown in FIG. 8, the second macro base station 210 creates subframes 0, 3, 4, 6, 8, 11 and 12 predicted to have a great size of the inter-cell interference signal as a first subframe set and subframes 1, 2, 5, 7 and 9 predicted to have a small size of the inter-cell interference signal as a second subframe set.

Here, the subframe set may be created using a cell-specific scheme or a terminal-specific scheme.

The second macro base station 210 then informs the terminal of information of the created subframe sets (step 730). The second macro base station 210 independently transmits a transmit power control (TPC) command to each terminal according to each created subframe set (step 740). Here, the second macro base station 210 may transmit both a TPC command uniquely applied to each subframe set and a TPC command applied to all subframe sets in common.

Based on the TPC command transmitted from the second macro base station 210, each terminal belonging to the second macro cell 200 coordinates transmit power of each subframe included in a corresponding subframe set, as shown in the following Equation 9:

$$UETx\ Power=P_0+\alpha \cdot PL+f(\Delta_{TPC\_SFS\_i})+\Delta_{TF}+10\log_{10}M[dBm] \quad \text{[Equation 9]}$$

In Equation 9, $\Delta_{TPC\_SFS\_i}$ denotes a TPC command of a subframe set i.

Further, when the second macro base station 210 transmits both a TPC command uniquely applied to each subframe set and a TPC command applied to all subframe sets in common, if each terminal receives the TPC command applied to all subframe sets in common, the terminal coordinates the transmit powers of all the subframes using Equation 10.

$$UETxPower=P_0+\alpha \cdot PL+f(\Delta_{TPC\_SFS\_i} \cdot \Delta_{TPC\_SFS\_A})+\Delta_{TF}+10\log_{10}M[dBm] \quad \text{[Equation 10]}$$

In Equation 10, $\Delta_{TPC\_SFS\_A}$ denotes a TPC command applied to all subframe sets.

While classification of subframes into two subframe sets is shown by way of example in FIGS. 7 and 8, the present invention is not limited thereto and it is understood that two or more subframe sets may be created according to an inter-cell interference situation.

While, in the embodiments of the present invention shown in FIG. 3 though 8, the second macro base station controlling the uplink transmit power is shown and described by way of example, this is for convenience of explanation and the present invention is not limited thereto. That is, the method of controlling uplink transmit power according to the embodiments of the present invention shown and described in FIG. 3 though 8 may be performed in the first macro base station or in all base stations located in adjacent cells (e.g., the first macro base station and the second macro base station), respectively.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of controlling uplink transmit power in a mobile communication system including first and second base stations respectively located in two adjacent cells, the method comprising:
   creating, by at least one of the first and second base stations, a subframe offset of transmit power (SOTP); and
   transmitting, by the at least one of the first and second base stations, the created SOTP to at least one terminal belonging to a corresponding one of the cells.

2. The method of claim 1, wherein the creating of the SOTP comprises:
   acquiring, by the second base station, resource allocation information of the first base station; and creating the SOTP for each subframe based on position information of an almost blank subframe (ABS) in the acquired resource allocation information of the first base station.

3. The method of claim 1, wherein the creating of the SOTP comprises creating the SOTP using either of a cell-specific scheme and a terminal-specific (UE specific) scheme.

4. The method of claim 3, wherein the transmitting of the created SOTP to the at least one terminal belonging to the corresponding one of the cells comprises transmitting the created SOTP through system information if the SOTP is created using the cell-specific scheme and through signaling of a protocol layer located in a higher layer than a second layer if the SOTP is created using the terminal-specific scheme.

5. The method of claim 1, further comprising correcting, by the at least one terminal receiving the SOTP from the second base station, transmit power of each subframe based on the SOTP.

6. The method of claim 1, wherein the creating of the SOTP comprises creating the SOTP as a vector of an SOTP having a certain period based on a position pattern of an almost blank subframe in the acquired resource allocation information of the adjacent cell.

7. The method of claim 6, further comprising correcting, by at least one terminal receiving the subframe offset vector of the transmit power from the second base station, transmit power of each subframe based on the SOTP vector.

8. The method of claim 1, wherein the creating of the SOTP comprises creating two SOTPs based on position information of an almost blank subframe in the acquired resource allocation information of the adjacent cell and setting the SOTP for each subframe as either of the two created SOTPs.

9. The method of claim 8, wherein the transmitting of the created SOTP to the at least one terminal belonging to the corresponding one of the cells comprises setting the one of the two created SOTPs as a reference offset and transmitting only positions of subframes to which the other offset is applied to the at least one terminal.

10. The method of claim 9, wherein the transmitting of the created SOTP to the at least one terminal belonging to the corresponding one of the cells comprises setting the one of the two created SOTPs as a reference offset and transmitting a period and position offsets of the subframes to which the other offset is applied to the at least one terminal if the positions of subframes to which the other offset is applied have the period.

11. A method of controlling uplink transmit power in a mobile communication system including first and second base stations respectively located in two adjacent cells, the method comprising:
creating a plurality of subframe sets by at least one of the first and second base stations;
transmitting, by the at least one of the first and second base stations, information of the plurality of created subframe sets to at least one terminal belonging to a corresponding cell of the cells; and
transmitting, by the at least one of the first and second base stations, a transmit power control (TPC) command for each created subframe set to the at least one terminal.

12. The method of claim 11, wherein the creating of the plurality of subframe sets by the at least one of the first and second base stations comprises:
acquiring, by the second base station, resource allocation information of the first base station; and
creating the plurality of subframe sets based on position information of almost blank subframes in the acquired resource allocation information of the first base station.

13. The method of claim 11, wherein the transmitting of the TPC command for each created subframe set to the at least one terminal comprises transmitting, by the second base station, a TCP command applied to all the subframe sets in common to the at least one terminal.

* * * * *